US008147581B1

(12) United States Patent
Watterman, Jr. et al.

(10) Patent No.: US 8,147,581 B1
(45) Date of Patent: Apr. 3, 2012

(54) GAS SOLID MIXTURE SEPARATOR

(76) Inventors: John K. Watterman, Jr., Roscommon, MI (US); Jonelle Manz, Vanderbilt, MI (US)

( * ) Notice: Subject to any disclaimer, the term of this patent is extended or adjusted under 35 U.S.C. 154(b) by 219 days.

(21) Appl. No.: 12/697,205

(22) Filed: Jan. 29, 2010

Related U.S. Application Data (60) Provisional application No. 61/148,339, filed on Jan. 29, 2009.

(51) Int. Cl.
*F01N 3/06* (2006.01)
(52) U.S. Cl. ............ 55/454; 55/400; 55/401; 55/402; 55/404; 55/405; 55/406; 55/407; 55/408; 55/409; 55/447; 95/270
(58) Field of Classification Search ............ 55/400–409, 55/447, 454, 467; 95/270
See application file for complete search history.

(56) References Cited

U.S. PATENT DOCUMENTS

| | | | | | |
|---|---|---|---|---|---|
| 3,371,470 | A | * | 3/1968 | Bullock | 96/286 |
| 3,450,333 | A | * | 6/1969 | Saueressig et al. | 55/393 |
| 3,500,614 | A | * | 3/1970 | Soo | 96/32 |
| 3,535,854 | A | * | 10/1970 | Taylor | 55/338 |
| 5,244,479 | A | * | 9/1993 | Dean et al. | 96/174 |
| 6,032,804 | A | * | 3/2000 | Paulson | 209/148 |
| 7,250,066 | B2 | * | 7/2007 | Seipler | 55/337 |
| 7,291,192 | B1 | * | 11/2007 | Lavasser et al. | 55/406 |
| 7,338,546 | B2 | * | 3/2008 | Eliasson et al. | 55/406 |
| 7,465,341 | B2 | * | 12/2008 | Eliasson | 96/281 |
| 7,591,882 | B2 | * | 9/2009 | Harazim | 95/270 |
| 7,628,836 | B2 | * | 12/2009 | Barone et al. | 55/406 |
| RE41,212 | E | * | 4/2010 | Lavasser et al. | 55/406 |
| 7,691,164 | B2 | * | 4/2010 | Kellermann | 55/467 |
| 7,771,501 | B2 | * | 8/2010 | Wang | 55/467 |
| 2003/0000184 | A1 | * | 1/2003 | Dean | 55/406 |
| 2009/0013658 | A1 | * | 1/2009 | Borgstrom et al. | 55/447 |
| 2010/0180854 | A1 | * | 7/2010 | Baumann et al. | 123/196 A |
| 2010/0186592 | A1 | * | 7/2010 | Le Flem | 95/270 |

* cited by examiner

*Primary Examiner* — Jason M Greene
*Assistant Examiner* — Dung Bui
(74) *Attorney, Agent, or Firm* — Robert L Farris; Farris Law, P.C.

(57) ABSTRACT

A separation housing houses a rotor with multiple suspension chambers. Each chamber has a radially extending web portion between two rotating discs. An orifice is provided through the radially extending web portion. Another web portion urges gas radially out of the rotor. Passages through the rotating disks permit entry of gas and solid particle mixtures into the suspension chambers at high speed traveling toward each other in a suspension adjacent to the orifice. The web portion that urges gas out of the chamber pulls gas away from the suspension zone. Gas moving through the aperture and into a clean gas chamber pulls gas in the opposite direction. The result is gas in the suspension zone being fixed relative to the rotor or changing direction. Centrifugal force moves solid particles radially out of the chamber.

2 Claims, 6 Drawing Sheets

GAS SOLID MIXTURE SEPARATOR

CROSS REFERENCE TO RELATED APPLICATION

This application claims the benefit of the filing date of U.S. Provisional Application No. 61/148,339, titled GAS SOLID MIXTURE SEPARATOR filed Jan. 29, 2009.

TECHNICAL FIELD

The separator separates solids such as dust from a gas such as air.

BACKGROUND OF THE INVENTION

Air and other gasses often need to be cleaned. Solids need to be separated from a gas at times for use in industrial applications or possibly as food. Solids can also be separated to keep a solid material out of the environment.

Cyclone separators are used to separate material such as flour from air. The cyclones can be relatively efficient if the solids are somewhat dense.

Filters are widely employed for separating solids from a gas. Some of these filters catch and hold solids until the filter is partially plugged. The plugged filter is then removed and destroyed or cleaned. Other filters are partially cleaned by short periods of gas back flow.

Filters generally require a large surface area and substantial space. Operations of many filter systems require a system shut down for filter cleaning or replacement.

Gasses, that need to be cleaned, may be at elevated temperatures. Gasses at high temperatures may destroy filters, cooling before filtering can be expensive. Gas scrubbing and cooling with water applied directly to the dirty air may create a toxic sludge that is difficult to contain.

SUMMARY OF THE INVENTION

The gas solid particle mixture separator includes a frame. A separator housing is attached to the frame and including a first side wall plate a second side wall plate, a wall secured to the first side wall plate, the second side wall plate and forming a rotor chamber. A hopper is secured to the first side wall plate, the second side wall plate and the wall and forming a lower portion of the separator housing. A valve assembly is attached to the hopper for closing the hopper and for opening the hopper to discharge solid particles received in the hopper.

A rotor support shaft is journaled on the frame and extends through a passage through the first side wall plate. A seal mounted on the first side wall plate receives the rotor support shaft.

An inlet passage directs gas and solid particles into the separator housing.

A rotor hub is mounted on the rotor support shaft inside the rotor chamber. A first disk, with a cylindrical outer edge is concentric with an axis of rotation of the rotor support shaft and spaced from the first side wall plate. A web is fixed to the first disk and extends from the first disk toward the second side wall plate. A second disk, with a cylindrical outer edge is concentric with the axis of rotation of the rotor support shaft. The second disk is attached to the web fixed to the first disk. The second disk is parallel to the first disk and spaced from the second side wall plate.

At least four suspension chambers are formed by the web between the first disk and the second disk. Each of the suspension chambers includes a radially extending portion which extends from the cylindrical outer edge of the first disk and the outer edge of the second disk and toward the axis of rotation. A central opening passes through the radially extending portion. An orifice plate is attached to the radially extending portion. An orifice in the orifice plate is in alignment with the central opening and provides a flow path for gas passage from the suspension chamber. A second web portion is normal to an inner end of the radially extending portion and extends away from an orifice plate side of the radially extending portion. A fourth web portion of the suspension chamber wall extends from the outer edges of the first disk and the second disk toward the radially extending portion at an angle. The angle results in the fourth web portion forcing gas through the radially facing open side of the suspension chamber. A web portion extends from the second web portion to the fourth web portion.

An arc portion of the web extends from the fourth web portion of one suspension chamber to the radially extending portion of an adjacent suspension chamber.

A passage extends through the first disk and into the suspension chamber. The passage is adjacent to the orifice plate. A flap adjacent to the passage extends inward from the first wall and toward the orifice at an angle.

A passage extends through the second disk and into the suspension chamber. The passage is adjacent to the orifice plate. A flap adjacent to the passage extends inward from the second wall and toward the orifice at an angle.

Gas passing through the first disk makes a ninety degree change in direction. Gas passing through the second disk makes a ninety degree change in direction. The gas passing through the second disk intersects the gas passing through the first disk moving in the opposite direction. The combined gas flow makes another change in direction of ninety degrees and moves in the direction of movement of the orifice plate and through the orifice and into a clean gas chamber. Centrifugal force moves solid particles out of the suspension chamber.

A clean gas discharge pipe is coaxial with the axis of rotation and is connected to the clean gas chamber. A gas outlet pipe is in communication with the clean gas discharge pipe and a passage through the second side wall plate.

BRIEF DESCRIPTION OF DRAWINGS

The presently preferred embodiment of the invention is disclosed in the following description and in the following drawings, wherein.

DETAILED DESCRIPTION OF THE PREFERRED EMBODIMENTS

Figure 2:
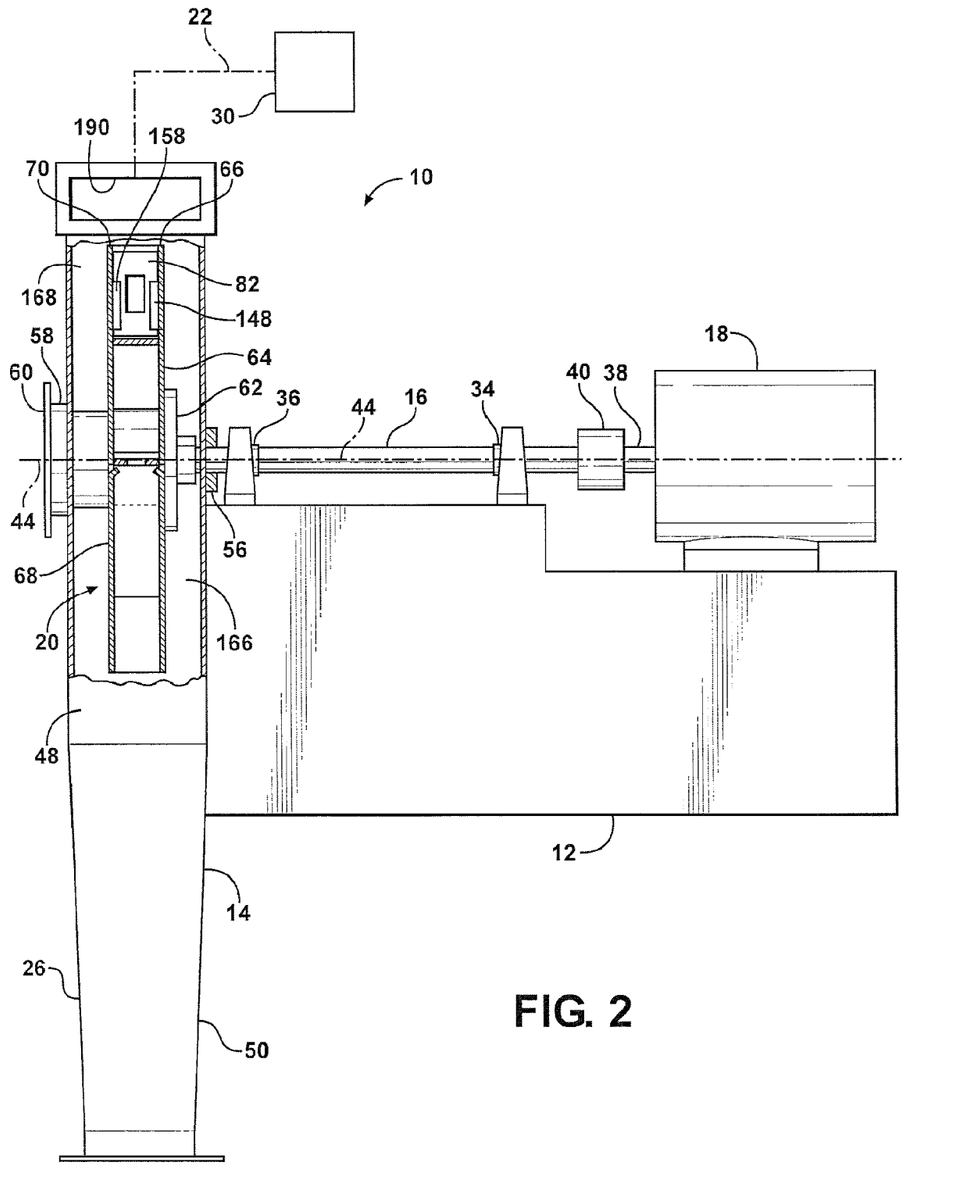
FIG. 2 is a sectional view taken along line 2-2 in FIG. 1.
Figure 3:
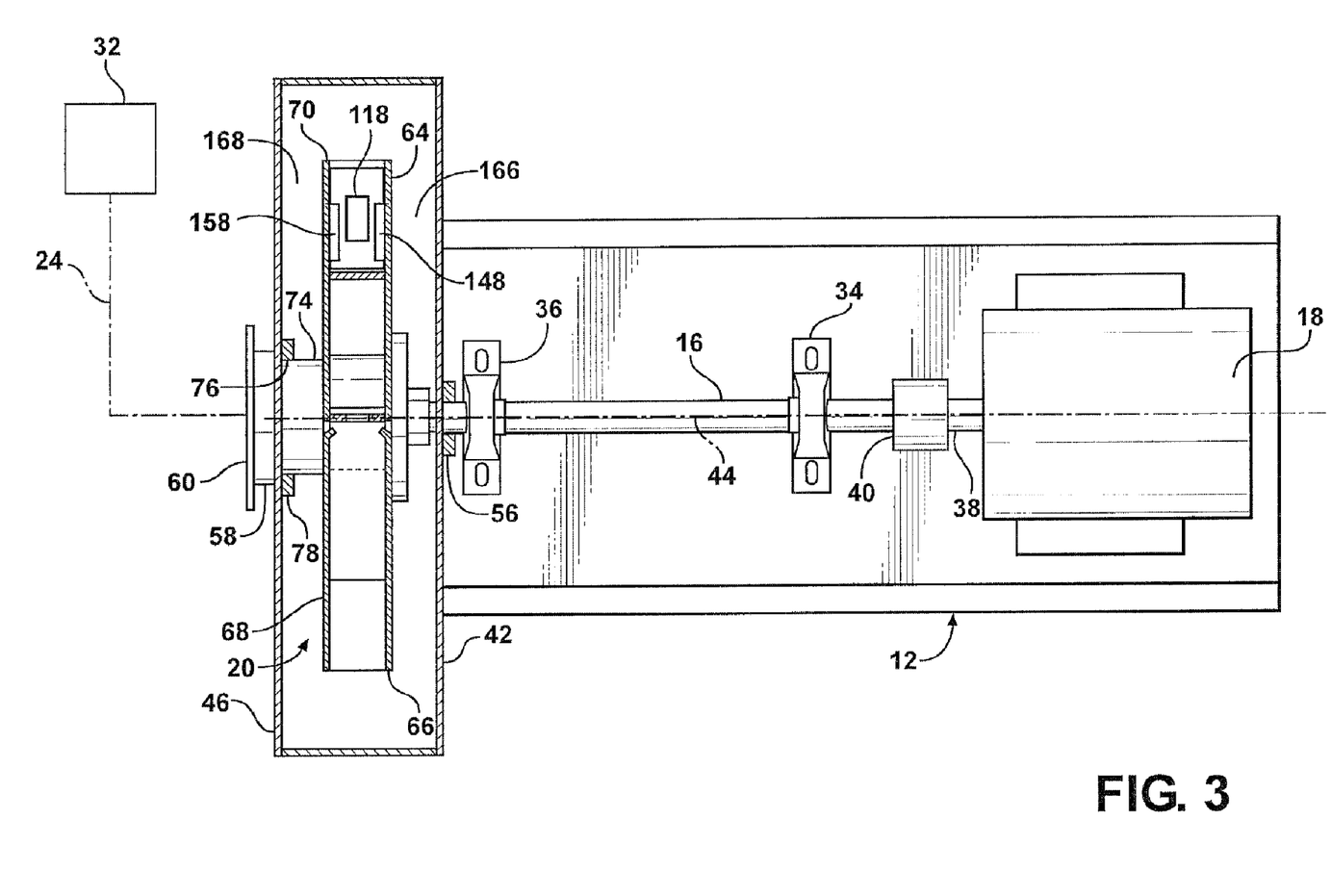
FIG. 3 is a sectional view taken along line 3-3 in FIG. 1.

The gas solid mixture separator 10, shown in FIG. 2 includes a support frame 12, a separator housing 14 supported by the support frame, a rotor support shaft 16, a drive motor 18 and a separation rotor assembly 20. Dirty gas is supplied to the separator housing 14 by a supply pipe 22. Clean gas is discharged from the separation rotor assembly 20 through a discharge pipe 24. The clean gas may be air or other gasses that need to be cleaned. Solids separated from the gas are collected in a lower portion 26 of the separator housing 14 and discharged into a container 28 for use or disposal.

Dirty gas may be forced into the supply pipe 22 by a blower 30. Clean gas may be sucked from the discharge pipe 24 by a clean gas fan 32. The clean gas fan 32 may be replaced by a stack if the gas to be separated is at an elevated temperature. The blower 30 may be eliminated thereby permitting the clean gas fan 32 to suck dirty gas from the supply pipe 22 and into the housing 14. Alternatively the clean gas fan 32 can be eliminated thereby permitting the blower 30 to force clean air through the clean gas discharge pipe 24.

The rotor support shaft 16 is journaled in two spaced apart bearings 34 and 36 that are attached to and supported by the support frame 12. The motor 18 is mounted on the support frame 12. The motor output shaft 38 is connected to the rotor support shaft 16 by a shaft coupler 40. The rotor support shaft 16 passes into the separator housing 14 as explained below.

The separator housing 14 includes a first side wall plate 42 that is fixed to the support frame 12 and perpendicular to the axis of rotation 44 of the rotor support shaft 16. A second side wall plate 46 is parallel to the first side wall plate 42 and spaced from the first side wall plate. A wall 48 is connected to the first side wall plate 42 and the second side wall plate 46 and encloses the top and both ends of the separator housing 14. The bottom of the separator housing 14 is closed by a hopper 50 that forms the lower portion 26 of the separator housing 14. The hopper 50 is connected to the first side wall plate 42 the wall 48, the second side wall plate 46 and forms a substantially sealed rotor chamber 52. A valve assembly 54 closes the bottom of the hopper 50. The rotor support shaft 16 passes through a shaft seal 56 and a passage through the first side wall plate 42. A clean gas outlet pipe 58 with a flange 60 is coaxial with the axis of rotation 44 and fixed to the second side wall plate 46. The discharge pipe 24 is connected to the flange 60.

The separation rotor assembly 20 includes a rotor hub 62 that is mounted on the rotor support shaft 16. A first disk 64 is connected directly to the rotor hub 62. The outer edge 66 of the disk 64 is a cylindrical surface that is concentric with the rotor axis 44. A second disk 68 is parallel to and spaced from the first disk 64. An outer edge 70 of the second disk 68 is a cylindrical surface that is concentric with the rotor axis 44. The second disk 68 has a circular central passage 72. A discharge pipe 74, for clean gas is fixed to the second disk 68. The pipe 74 rotates with the second disk 68 and extends from the second disk through a passage 76 in the second side wall plate and into the gas outlet pipe 58. A seal 78 is provided to seal between the discharge pipe 74 and the second side wall plate 46.

Figure 1:
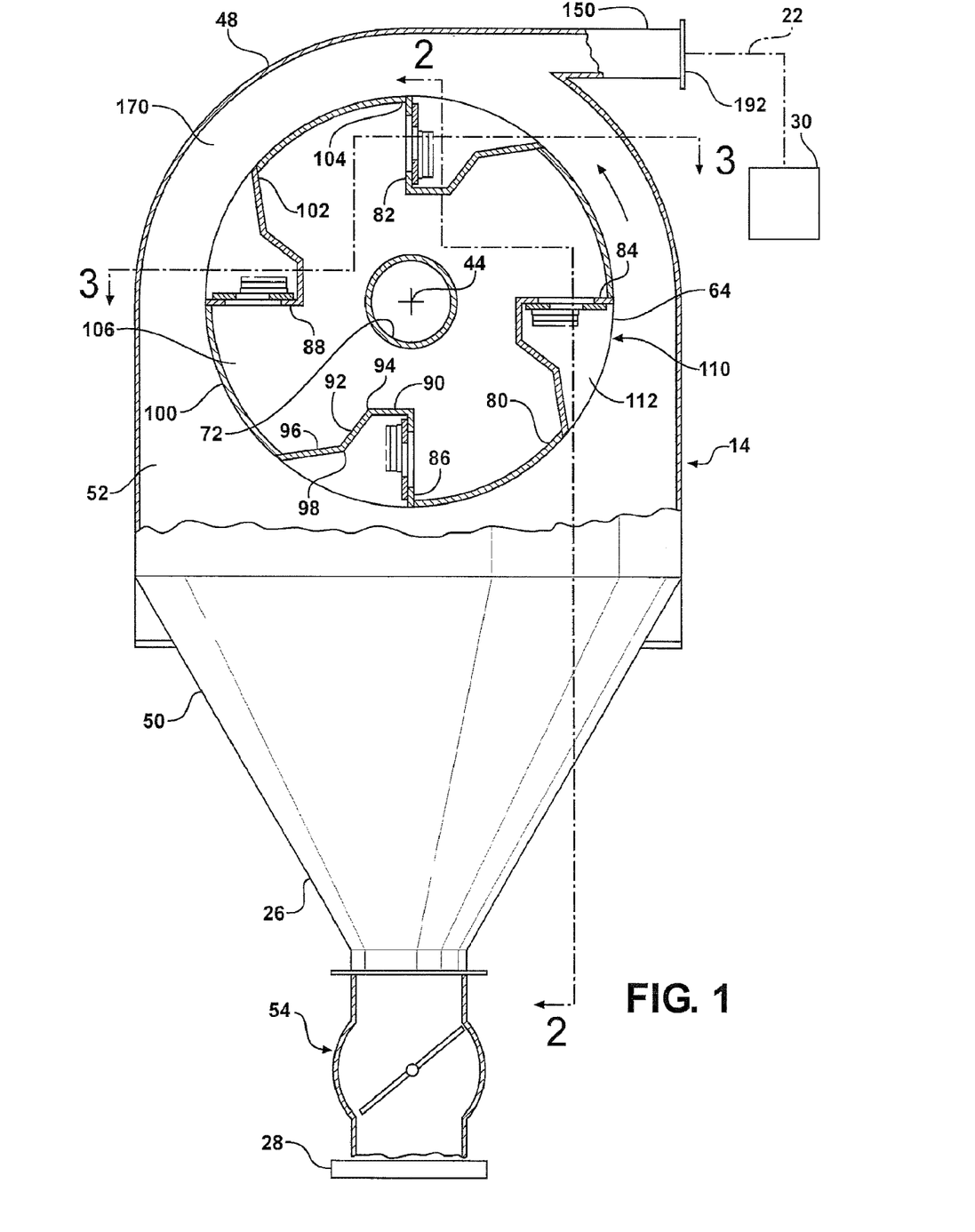
FIG. 1 is an end elevational view of the gas and solid particles mixture separator with parts broken away.

A web 80 is secured to the first disk 64 and the second disk 68. The web 80 has four radially extending portions 82, 84, 86 and 88 that extend radially inward from the outer edge 66 of the first disk 64 and the outer edge 70 of the second disk 68. Each radially extending portion 82, 84, 86 and 88 extends almost half the distance from the outer edges 66 and 70 to the rotor axis 44. The radially extending portions 82, 84, 86 and 88 are spaced ninety degrees apart about the rotor axis 44 from each other as shown in FIG. 1. Second web portions 90 extend from an inner end of each radially extending portion 82, 84 86 and 88 in a clock wise direction as shown in FIG. 1. Each web portion 90 is normal to the radially extending portion 82, 84, 86 or 88 it is integral with and extends from. A web portion 92 is integral with an end 94 of each web portion 90 and extends away from the rotor axis 44 at an angle of about thirty degrees from the web portion 88, 84, 86 or 88 which it is adjacent to. A fourth web portion 96 extends from an integral end 98 of the web portion 92 to an arc portion 100 of the web 80. Each arc portion 100 has a radius from the rotor axis 44 that is equal to the radius of the outer edges 66 and 70 of the first disk 64 and the second disk 68. Each of the four arc portions 100 extend about forty five degrees about the rotor axis 44 and have an end that is integral with an end 102 of the adjacent forth web portion 96 and an end 104 that is connected to the radially outer end of one of the web portions 82, 84, 86 and 88. The web 80 is preferably made from one strip of material and has only one end joint. The continuous web 80 creates a clean gas chamber 106 in the center of the rotor 20. The continuous web 80 could be fabricated from two or more separate parts if desired. The continuous web 80 also creates four suspension chambers 110. Each suspension chamber 110 has a radially facing open side 112. The open side 112 is encircled by the one of the radially extending portions 82, 84, 86 or 88, a first disk 64, and end 102 of a forth web portion 96 and the second disk 68. The suspension chambers 110 are defined by a forth web portion 96, a web portion 92 a second web portion 90, a radially extending portion 82, 84, 86 or 88, a first disk 64 and a second disk 68.

Figure 4:
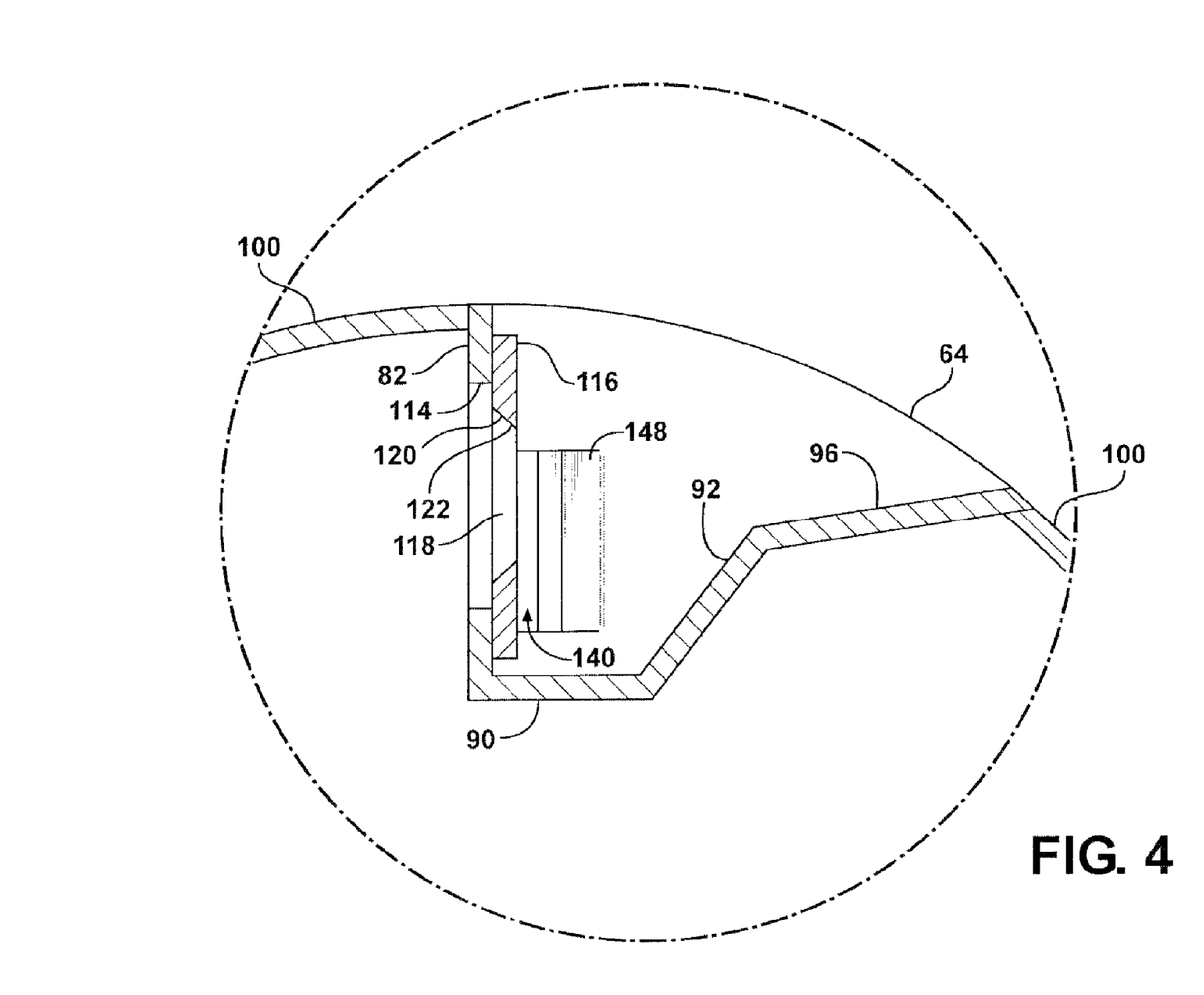
FIG. 4 is an enlarged side elevational view of one suspension chamber, in the separation rotor assembly, with the second disk and half the web removed.
Figure 6:
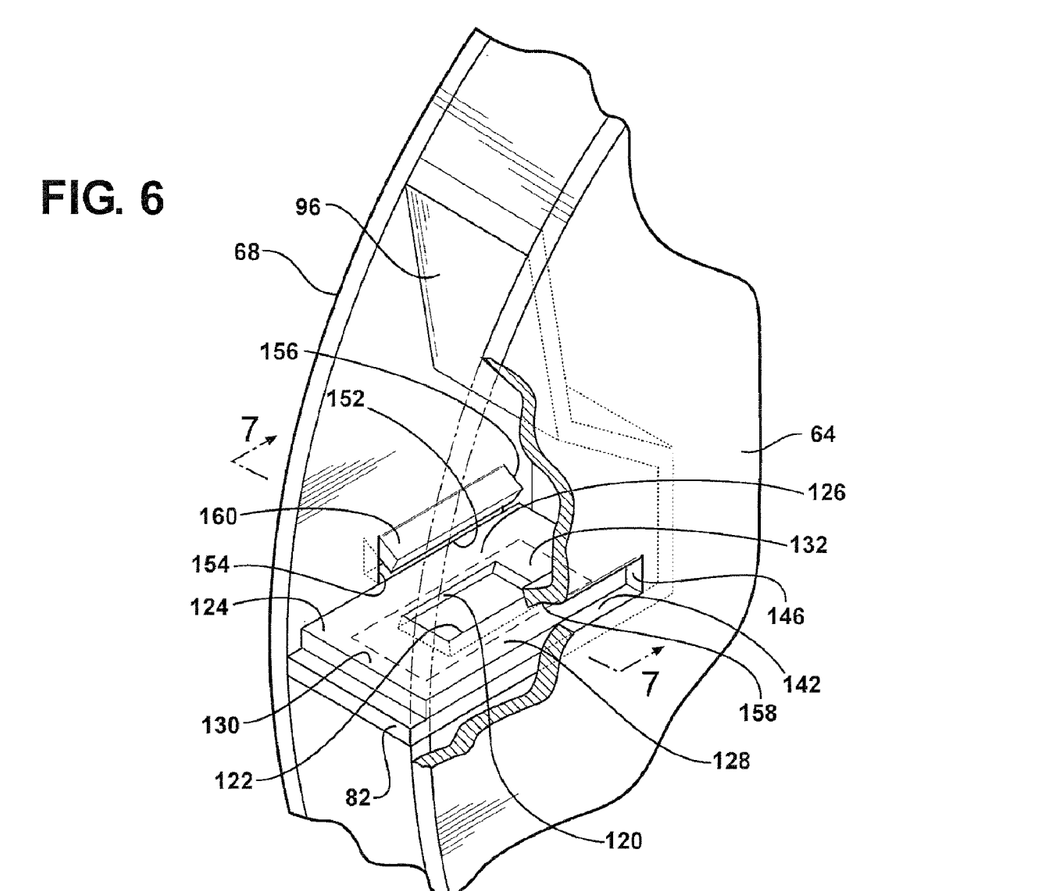
FIG. 6 is an enlarged perspective view of the separation rotor assembly with parts broken away to show the suspension chamber.
Figure 7:
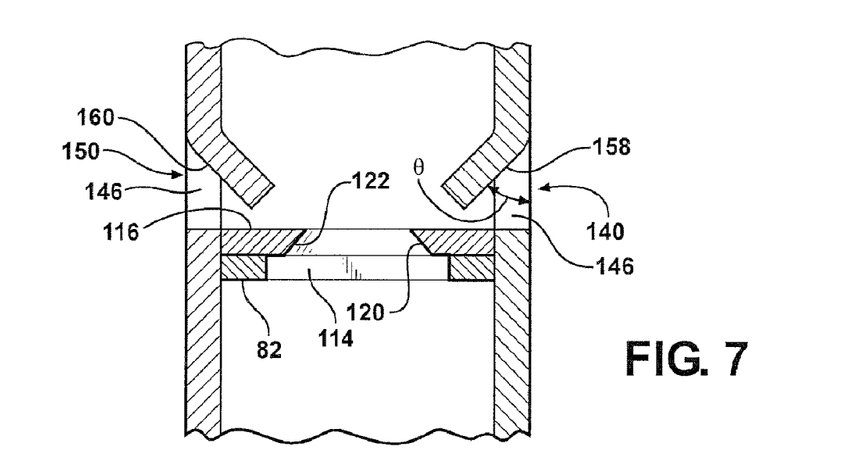
FIG. 7 is an enlarged sectional view taken along line 7-7 in FIG. 6.

Each of the radially extending portions 82, 84, 86 and 88 of the web 80 has a central opening 114. An orifice plate 116 is fixed to the side, of each radially extending portion 82, 84, 86 and 88 of the web 80 facing a suspension chamber 110. The orifice plate 116 includes an orifice 118 that is smaller than the central opening 114. The orifice 118 has beveled edges 120. The beveled surfaces 120 provide a passage that increases in cross section area from the suspension chamber 110 side to the clean gas chamber 106 side. The beveled surfaces 120 form a sharp edge 122 encircling the orifice 118 and reduce flow restriction. The orifice plate 116 includes a flat surface 124 that faces the suspension chamber 110. This surface 124 includes a surface portion 126 that extends from the second disk 68 to the orifice 118, a surface portion 128 that extends from the first disk 64 to the orifice, a surface portion 130 that extends from outer edge 66 of the first disk and the outer edge 70 of the second disk to the orifice, and a surface portion 132 that extends radially outward from the second web portion 90 to the orifice. The orifice plate 116 is a separate member as described above. As a separate member, the orifice plate 116 can be replaced from time to time if there is excessive wear. However, the orifice 118 can be formed in the radially extending portions 82, 84, 86 and 88 of the web 80. If the orifice 118 is formed directly in the web 80, the orifice plate 116 and the central opening 114 are eliminated.

Passages 140 are provided in the first disk 64 for the passage of gas and solids into each suspension chamber 110. The passages 140 are formed by making a radial cut 142 adjacent to each of the flat surface 124 around each orifice 118. Short cuts 144 and 146 that extend away from the flat surface 124 are made at each end of the radial cut 142 to form a flap 148. The flap 148 is bent inwardly toward the second disk 68 to open the passage 140 and to direct gas and solids passing through the passage toward the surface portion 128. The flap 148 is bent to an angle θ of about sixty degrees from the vertical first disk 64.

Passages 150 are provided in the second disk 68 for the passage of gas and solids into each suspension chamber 110. The passages 150 are formed by making a radial cut 152 adjacent to each of the flat surfaces 124 around each orifice 118. Short cuts 154 and 156 that extend away from the flat surface 124 are made at each end of the radial cut 152 to form a flap 158. The flap 158 is bent inward toward the first disk 64 to open the passage 150 and to direct gas and solids passing through the passage toward the surface portion 126. The flap 158 is bent to an angle θ of about sixty degrees from the vertical second disk 68.

Figure 5:
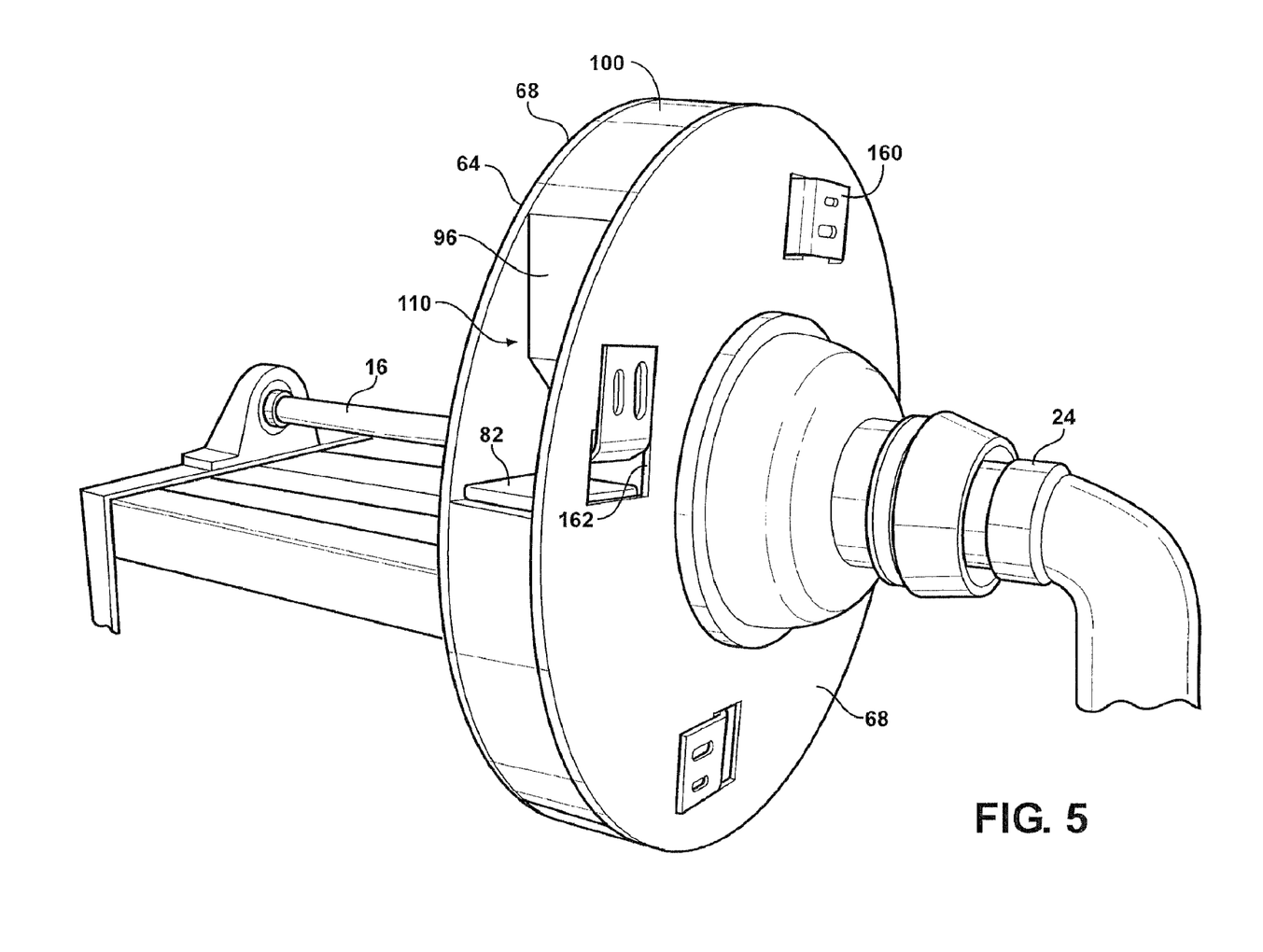
FIG. 5 is a perspective view of a modified driven rotor with the fixed housing removed.

FIG. 5 shows flaps 160 that are adjustable to change the size of the passage 162 through the first disk 64. Adjustable flaps 160 are generally not needed.

The separator housing 14 has an inside width between the first side wall plate 42 and the second side wall plate 46 that is about twice the outside width of the separation rotor assembly 20. There are therefore substantial areas 166 and 168 between the rotor assembly 20 and both side wall plates 42 and 46. A wall 48 of the separator housing 14 extends from plate 42 to plate 46. The wall 48 is a substantial distance from the outer edges 66 and 70 of the first disk 64 and the second disk 68 of separation rotor assembly 20. There is therefore a substantial gas and solids passage 170 and connected areas 166 and 168 which gas and solids can pass through.

The separation rotor assembly 20, shown in the Drawing Figures, works well between seven hundred and fourteen hundred revolutions per minute. The number of suspension chambers 110 can be increased or decreased if desired. Increases in the number of suspension chambers 110 can be accommodated by reducing the length of arc portions 100 of the web 80 to provide additional space for the suspension chambers 110. Additional suspension chambers 110 can also be added by increasing the diameter of the separation rotor 20. Increasing the rotor diameter will change the dynamics and the forces on the solids. A larger diameter separation rotor assembly 20 may rotate slower. Capacity can also be increased by adding additional rotor assemblies.

During operation of the gas and solids mixture separator 10, the separation rotor assembly 20 is driven in a counter clockwise direction, as shown in FIG. 1, by the motor 18 through the rotor support shaft 16. A mixture of gas and solids enters the separator housing 14 through an inlet pipe 190. The inlet pipe 190 receives the mixture of gas and solids from supply pipe 22 attached to a flange 192 on the inlet pipe 190. The mixture of gas and solids enters the separator housing tangentially to an inside surface to an arcuate portion of the wall 48 secured to the first side wall plate 42 and the second side wall plate 46. While moving through the passage 170, solids mixed with gas tend to move radially outward toward the wall 48 and then into the lower portion 26 of the separator housing 14. The solids collect in the lower portion 26 and are held until the valve assembly 54 is opened.

The mixture of gas with a reduced quantity of solids moves radially toward the axis of rotation 44 and into areas 166 and 168 adjacent to outside surfaces of the first disk 64 and the second disk 68. The mixture of gas and solids in engagement with the first disk 64 and the second disk 68 tends to move with the disks. The solids in the gas will be moving with the outer surfaces of the first disk 64 and the second disk 68 and will be moved radially outward due to centrifugal force. Gas and some mixed solid in area 166 will move close to one of the passages 140 and will make a ninety degree change in direction of movement and pass through the passages and into a suspension chamber 110. Some solid particles will not make the ninety degree direction change and will be collected in the lower portion 26 of the housing 14. Gas and some mixed solids in area 168 will move close to one of the passages 150 and will make a ninety degree change in direction of movement and pass through the passages and into a suspension chamber 110. Some solid particles will not make the ninety degree direction change and will be collected in the lower portion 26 of the housing 14.

The gas and mixed solids that pass through the passage 140 are directed by the flap 148 toward the surface 128 of the orifice plate 116. The gas and mixed solids that pass through the passage 150 are directed by the flap 158 toward the surface 126 of the orifice plate 116.

The passages 140 and 150 are offset radially toward the axis of rotation 44 of the separation rotor assembly 20. The flow of gas and mixed solids through the passages 140 and 150 is fast. However, this flow is cancelled out when the two flows meet on the suspension chamber 110 near the orifice 118 in the orifice plate 116. The passages 140 and 150 are offset, as explained above, so that the suspension zone where the gas flows from both passages meet is substantially centered over the orifice 118. Centrifugal force shifts the location of intersection of the gas flows from passages 140 and 150 radially outward from the location of the passages. The passages 140 and 150 are positioned radially inward toward the axis 44 relative to the orifice 118 to accommodate the shift.

The floor of the suspension chamber 110 including the fourth web portion 96 tends to move gas out of the suspension chamber and away from the orifice 118 in the orifice plate 116. The suction of gas through the orifice 118 by the clean gas fan 32 balances the force of the floor of the suspension chamber 110 and suspends gas directly over the orifice. When the fixed suspension zone is created in alignment with the orifice 118 indicating no flow relative to the rotor 20, and spaced from the orifice, centrifugal force discharges solids through the radially facing open side and cleaned gas passes through the orifice plate 116. The centrifugal force is relative strong due to the high density of solids relative to the density of air. The gas in the suspension zone adjacent to the orifice 118 appears to be stationary. It is believed that gas molecules may be moving in random directions.

Use of the clean gas fan 32 is preferred for changing the direction of flow of cleaned gas toward and through the orifice 118.

We claim:

1. A gas and solid particle mixture separator comprising:
a frame;
a separator housing attached to the frame;
a hopper secured to a lower portion of the separator housing;
a valve assembly attached to the hopper for closing the hopper and for opening the hopper to discharge solid particles received in the hopper;
a rotor support shaft journaled on the frame and extending into the separator housing;
an inlet passage for directing gas and solid particles into the separator housing;
a rotor hub mounted on the rotor support shaft inside the separator housing, with an outer edge, a web fixed to the first disk and extending from the first disk, a second disk, with an outer edge, attached to the web fixed to the first disk;
at least two suspension chambers formed by the web between the first disk and the second disk each of which includes a radially extending portion which extends from the cylindrical outer edge of the first disk and the outer edge of the second disk toward an axis of rotation, an orifice through the radially extending portion and providing a flow path for gas passage from the suspension chamber, a second web portion normal to an inner end of the radially extending portion and extending away from the radially extending portion, a fourth web portion of the suspension chamber wall that extends from the outer edges of the first disk and the second disk toward the radially extending portion at an angle that results in forcing gas through a radially facing open side of the suspension chamber, a web portion that extends from the second web portion to the fourth web portion;

an arc portion of the web extending from each fourth web portion of one suspension chamber to the radially extending portion of an adjacent suspension chamber;

a passage through the first disk and into the suspension chamber and adjacent to the orifice and a flap adjacent to the passage that extends inward from the first wall and toward the orifice at an angle;

a passage through the second disk and into the suspension chamber and adjacent to the orifice and a flap adjacent to the passage that extends inward from the second wall and toward the orifice at an angle;

wherein gas passing through the first disk makes a ninety degree change in direction, gas passing through the second disk makes a ninety degree change in direction and intersects the gas passing through the first disk moving in the opposite direction, the combined gas flow makes another change in direction of ninety degrees and moves in the direction of movement of the orifice and through the orifice and into a clean gas chamber and centrifugal force moves solid particles out of the suspension chamber; and a clean gas discharge pipe from the separator housing.

2. A gas and solid particle mixture separator comprising:

a frame;

a separator housing attached to the frame and including a first side wall plate, a second side wall plate, a wall secured to the first side wall plate, the second side wall plate and forming a rotor chamber;

a hopper secured to the first side wall plate, the second side wall plate and the wall and forming a lower portion of the separator housing;

a valve assembly attached to the hopper for closing the hopper and for opening the hopper to discharge solid particles received in the hopper;

a rotor support shaft journaled on the frame and extending through a passage through the first side wall plate, and a seal mounted on the first side wall plate and receiving the rotor support shaft;

an inlet passage for directing gas and solid particles into the separator housing;

a rotor hub mounted on the rotor support shaft inside the rotor chamber, a first disk, with a cylindrical outer edge that is concentric with an axis of rotation of the rotor support shaft and spaced from the first side wall plate, a web fixed to the first disk and extending from the first disk toward the second side wall plate, a second disk, with a cylindrical outer edge that is concentric with the axis of rotation of the rotor support shaft, attached to the web fixed to the first disk and wherein the second disk is parallel to the first disk and spaced from the second side wall plate;

at least four suspension chambers formed by the web between the first disk and the second disk each of which includes a radially extending portion which extends from the cylindrical outer edge of the first disk and the outer edge of the second disk toward the axis of rotation, a central opening through the radially extending portion, and an orifice plate attached to the radially extending portion and having an orifice in alignment with the central opening and providing a flow path for gas passage from the suspension chamber, a second web portion normal to an inner end of the radially extending portion and extending away from an orifice plate side of the radially extending portion, a fourth web portion of the suspension chamber wall that extends from the outer edges of the first disk and the second disk toward the radially extending portion at an angle that results in forcing gas through a radially facing open side of the suspension chamber, a web portion that extends from the second web portion to the fourth web portion;

an arc portion of the web extending from each fourth web portion of one suspension chamber to the radially extending portion of an adjacent suspension chamber;

a passage through the first disk and into the suspension chamber and adjacent to the orifice plate and a flap adjacent to the passage that extends inward from the first wall and toward the orifice at an angle;

a passage through the second disk and into the suspension chamber and adjacent to the orifice plate and a flap adjacent to the passage that extends inward from the second wall and toward the orifice at an angle;

wherein gas passing through the first disk makes a ninety degree change in direction, gas passing through the second disk makes a ninety degree change in direction and intersects the gas passing through the first disk moving in the opposite direction, the combined gas flow makes another change in direction of ninety degrees and moves in the direction of movement of the orifice plate and through the orifice and into a clean gas chamber and centrifugal force moves solid particles out of the suspension chamber; and a clean gas discharge pipe coaxial with the axis of rotation and connected to the clean gas chamber, a gas outlet pipe in communication with the clean gas discharge pipe and a passage through the second side wall plate.

* * * * *